Sept. 11, 1923.
W. W. GOWIN
VIBROMETER
Filed Feb. 14, 1922
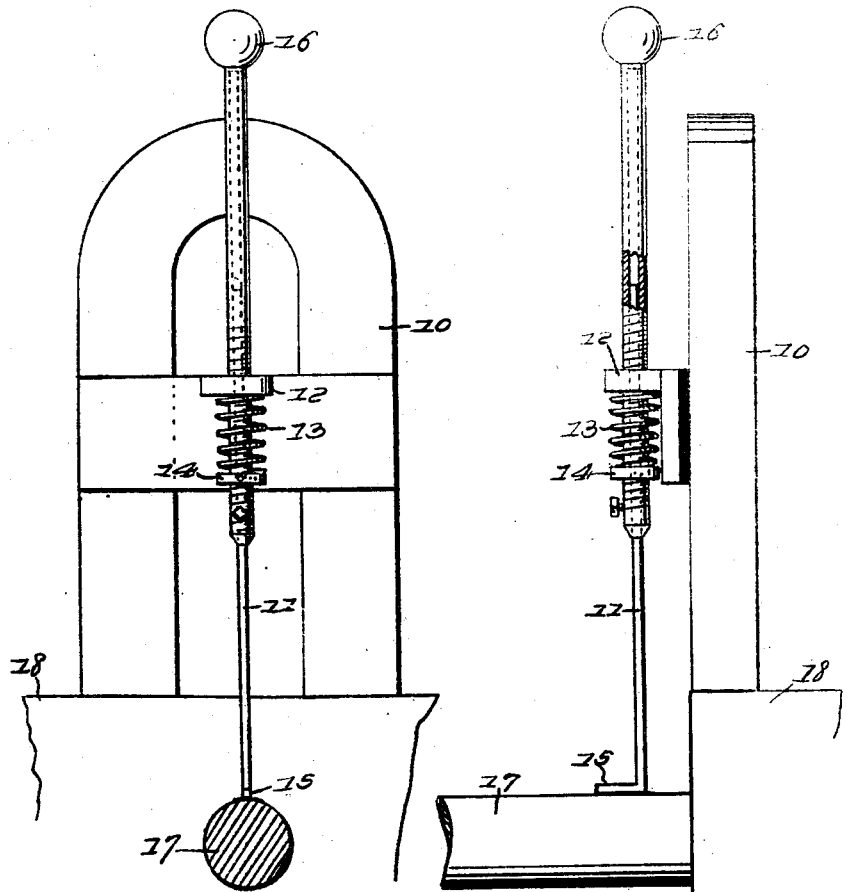
Inventor
W. W. Gowin,
By _____
Attorney Patented Sept. 11, 1923.

1,467,373

UNITED STATES PATENT OFFICE.

WALTER W. GOWIN, OF OMAHA, NEBRASKA.

VIBROMETER.

Application filed February 14, 1922. Serial No. 536,459.

*To all whom it may concern:*

Be it known that WALTER W. GOWIN, a citizen of the United States of America, residing at Omaha, in the county of Douglas and State of Nebraska, has invented new and useful Improvements in Vibrometers, of which the following is a specification.

The object of the invention is to provide a simple and efficient tool for readily and accurately determining the extent of vibration or lost motion of a shaft, spindle or like rotary machine element with reference to its bearing or sleeve in which it is mounted or through which it extends in the communication of motion to related elements such as those which exist between a wrist pin and the knuckle of the connecting rod in which it is fitted, for the purpose of accurately determining whether or not the play or looseness is excessive or is only such as is necessary in order to insure a proper operation of the elements; and with this object in view the invention consists in a construction and combination of parts of which a preferred embodiment is shown in the accompanying drawings, wherein:—

Figure 1 is an elevation of a vibration measuring apparatus embodying the invention.

Figure 2 is a side view of the same.

The device consists essentially of a support or standard 10 and a needle 11 reciprocably mounted in a suitable guide 12 for movement longitudinally of the support or standard and yieldingly impelled in one direction by a spring 13 bearing at one end against the stationary guide 12 and at the other end against a collar 14 which is threaded or otherwise adjustably mounted upon the needle or stem which at one end is fitted with a bearing foot 15 and at the other end may be provided with a knob or handle 16.

It is proposed in determining the extent of vibration of a shaft such as indicated at 17 to place the support or standard 10 upon a stationary portion of the shaft bearing, indicated for example at 18, with the bearing foot of the needle or stem in contact with the surface of the shaft and yieldingly held in contact therewith and subject to movement by any vibrations or oscillations of the shaft, so that the extent of such vibration may readily be determined by observing the ball or knob 16 or any like or preferred indicating element, to the end that the operator or engineer may determine whether the amount of vibration is excessive or is within the range of approved mechanical or engineering limits, and therefore whether bushing or adjustment is required or not,— the utility of the tool obviously being apparent as well as with shafting which has been used and therefore which may require repairing or readjustment as with that which is being erected and adjusted in the first instance.

It is essential, however, for accuracy in the indications of the apparatus in connection with shafting which is in more or less rapid rotation and where the bearing may be subject to sympathetic vibration due to jarring or otherwise, and more especially where it is desired to measure the extent of play or independent vibration of a spindle or wrist pin operating in the bearing or joint of a connecting rod or its equivalent, that the standard or support of the instrument be held firmly seated on the bearing against possibility of displacement or vibration independently thereof; and to this end the support or standard consists of a horse shoe magnet or is otherwise adapted to afford an adhesive engagement with the bearing or other supporting object. It has been found in practice that the use of a magnet in this connection is effective and that it may be readily applied to and removed from a bearing even when in comparatively rapid movement, and that when positioned it will be retained in position indefinitely notwithstanding the more or less violent vibration or movement of the carrying object, and will enable the operator to make the desired investigation with the required degree of accuracy.

Having described the invention, what is claimed as new and useful is:—

1. An apparatus for measuring the extent of vibration of a shaft or spindle in its bearing which consists of a standard or support and a vibratory needle carried by the same and yieldingly impelled in one direction for bearing contact with the surface of the shaft or spindle, the needle being provided with an indicator.

2. An apparatus for measuring the extent of vibration of a shaft or spindle in its bearing which consists of a standard or support and a vibratory needle carried thereby and yieldingly impelled in one direction for bearing contact with the surface of the shaft or spindle, the needle being provided with an indicator and having a bearing foot for contact with the shaft or spindle and being adapted for arrangement in radial relation therewith.

3. An apparatus for measuring the extent of vibration of a shaft or spindle in its bearing which consists of a standard or support and a vibratory needle yieldingly impelled in one direction for bearing contact with the surface of the shaft or spindle, the support or standard having a guide in which the needle is slidably carried and the latter being provided with an indicator and actuable by a tensionable spring.

4. An apparatus for measuring the extent of vibration of a shaft or spindle in its bearing which consists of a standard or support and vibratory needle carried thereby and yieldingly impelled in one direction for bearing contact with the surface of the shaft or spindle, the needle having an indicator and the support or standard having means for adhesively engaging a bearing or relatively fixed object adjacent to the shaft.

5. An apparatus for measuring the extent of vibration of a shaft or spindle in its bearing which consists of a standard or support and vibratory needle carried thereby and yieldingly impelled in one direction for bearing contact with the surface of the shaft or spindle, the needle having an indicator and the support or standard being permanently magnetized for adhesive engagement with a bearing block.

6. An apparatus for measuring the extent of vibration of a shaft or spindle in its bearing which consists of a standard or support and a vibratory needle carried thereby and yieldingly impelled in one direction for bearing contact with the surface of the shaft or spindle, the support or standard consisting of a horse shoe magnet for adhesive engagement with a bearing block.

In testimony whereof he affixes his signature.

WALTER W. GOWIN.